Patented June 24, 1930                                              1,766,067

UNITED STATES PATENT OFFICE

MELVIN DE GROOTE, OF ST. LOUIS; LOUIS T. MONSON, OF MAPLEWOOD; AND ARTHUR F. WIRTEL, OF WEBSTER GROVES, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.        Application filed January 21, 1929. Serial No. 334,117.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells, and from the bottoms of oil storage tanks and are commonly referred to as "cut oil," "roily oil," "emulsified oil" and "bottom settlings."

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent employed in our process consists of an aromatic sulfonic acid obtained by condensation of an aromatic body and a polyhydric alcohol residue. It is derived by the action of a condensing agent and a sulfonating agent on an aromatic body and a polyhydric alcohol having fewer than twelve carbon atoms. The aromatic body used in the manufacture or production of said treating agent, may consist of benzene, toluene, xylene, napthalene, anthracene, napthacene, or other substances having similar properties. Instead of the unaltered aromatic bodies, derivatives may be employed, such as halogen derivatives, nitro derivatives, hydrogenated derivatives, or hydroxy derivatives, if desired, the sulfonic group may be introduced into the aromatic body before the introduction of polyhydric alcohol residues of the kind hereinafter described; for instance, benzene or naphthalene sulfonic acid, or beta naphthol sulfonic acid may be employed. The most desirable method of introducing the polyhydric alcohol residue into the aromatic nucleus is by treating the mixture of polyhydric alcohol and aromatic body with strong sulfonating agents, such as sulfuric acid, oleum, chloro-sulfonic acid, preferably in excess, at elevated temperature, and especially in the presence of a small quantity of a phosphorus compound, such as phosphoric acid, phosphorus pentachloride, or phosphorus oxychloride, and during such an operation sulfonation of the aromatic body also takes place, thus producing a sulfonated condensation product.

The polyhydric alcohol employed is an aliphatic alcohol, such as ethylene glycol, propylene glycol, or glycerol. The term "polyhydric alcohol" is used to define organic materials containing two or more hydroxyl groups in the molecule and characterized further in that they form aliphatic hydrogen sulfates with strong sulfuric acid. Obviously, two or more polyhydric alcohol residues can be introduced into the aromatic body, and furthermore, more than one sulfonic group can be introduced. The polyhydric alcohol residues may be the same or different; that is, one may be an ethylene glycol residue and the other a propylene glycol residue. Likewise, the polyhydric alcohol residue may be introduced together with a ketone residue, an aldehyde residue, a monohydric alcohol residue, or a fatty residue.

In manufacturing or producing the treating agent contemplated by our process, we prefer to use the following procedure: One mole of naphthalene is mixed with two moles of ethylene glycol in the presence of a large excess of 66° sulfuric acid at a temperature above the melting point of naphthalene. Said reaction is continued until at least one of the ethylene glycol residues, and preferably both, are introduced into the polycyclic nucleus with the simultaneous introduction of one sulfonic group.

Our broad idea contemplates the use of a treating agent having the general characteristics pointed out, produced in various ways.

The treating agent that we prefer to use, however, is one that produces an insoluble precipitate with a soluble alkaline earth salt. The presence or absence of such precipitate probably depends on the number of sulfonic groups introduced into the aromatic body. Therefore, it is our preference that the reaction be carried on so that the product of reaction will show insolubility with alkaline earth salts by a suitable test, such as the following. A 1% solution of the reagent is mixed with a 1% solution of magnesium sulfate and heated for 10 to 30 minutes in a water bath just below the boiling point of water, if required. In the test with either the calcium salt or the magnesium salt, a precipitate should be obtained which remains after the mixture is diluted with two times the volume of distilled water.

A material or substance of the kind described can be employed as an acid mass to treat a petroleum emulsion, but this is not desirable, due to its corrosive effect. There is no objection to an excess of alkali, if desired. Such material can also be converted into an ester by esterification in the usual manner to produce an aromatic or aliphatic ester, such as the ethyl ester. Some of the esters so produced may be oil-soluble, such as the hexyl ester. The treating agent, when it is ready for use, may be acidic in nature, and the complex substituted aromatic sulfonic group may be united with an acid hydrogen ion, as is the case when the acid itself is employed. When said acidic material is neutralized, the hydrogen ion is replaced by a suitable metallic ion equivalent, such as a true metallic ion or an ammonium radical. In the event that the material is esterified, the hydrogen ion is replaced by an organic radical, such as an ethyl radical. We will refer to the hydrogen ion or its metallic substitute or its organic substitute as the hydrogen ion equivalent.

The form, state or condition of the treating agent at the time it is mixed with or applied to the petroleum emulsion to be treated, may be varied to suit existing conditions. It can be used in a substantially anhydrous state or in solutions of any convenient strength. A concentrated solution can be emulsified into oil by agency of any suitable oil-soluble emulsifier, such as calcium oleate. The treating agent can be formed from a material of the kind previously described, or it can be formed from such a material in combination with other well-known treating agents for petroleum emulsions of the water-in-oil type, such as water softeners, modified fatty acids, or their soaps, petroleum sulfonic acids or their soaps, or other substances having similar properties.

In practising our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored, or introducing the treating agent into a container that holds a sludge obtained from the bottom of an old storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other or various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercial satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing an aromatic sulfonic body obtained by condensation of an aromatic body and an aliphatic polyhydric alcohol having fewer than twelve carbon atoms.

2. A process for breaking a petroleum emulsion of the water-in-oil type, which consists in subjecting the emulsion to the action of a water-soluble demulsifying agent containing an aromatic sulfonic body obtained by condensation of an aromatic body and an aliphatic polyhydric alcohol having fewer than twelve carbon atoms.

3. A process for breaking a petroleum emulsion of the water-in-oil type, which consists in subjecting the emulsion to the action of a water-soluble demulsifying agent containing a water-soluble salt of an aromatic sulfonic body obtained by condensation of an aromatic body and a polyhydric alcohol having fewer than twelve carbon atoms.

4. A process for breaking a petroleum emulsion of the water-in-oil type, which consists in subjecting the emulsion to the action of a water-soluble demulsifying agent containing an ammonium salt of an aromatic sulfonic body obtained by condensation of an aromatic body and an aliphatic polyhydric alcohol having fewer than twelve carbon atoms.

5. A process for breaking a petroleum emulsion of the water-in-oil type, which consists in subjecting the emulsion to the action of a demulsifying agent containing an aromatic sulfonic body obtained by condensation of a bicyclic aromatic body and an aliphatic polyhydric alcohol having fewer than twelve carbon atoms.

6. A process for breaking a petroleum emulsion of the water-in-oil type, which consists in subjecting the emulsion to the action of a water-soluble demulsifying agent containing an aromatic sulfonic body obtained by condensation of a bicyclic aromatic body and an aliphatic polyhydric alcohol having fewer than twelve carbon atoms.

7. A process for breaking a petroleum emulsion of the water-in-oil type, which consists in subjecting the emulsion to the action of a water-soluble demulsifying agent containing a water-soluble salt of an aromatic sulfonic body obtained by condensation of a bicyclic aromatic body and an aliphatic polyhydric alcohol having fewer than twelve carbon atoms.

8. A process for breaking a petroleum emulsion of the water-in-oil type, which consists in subjecting the emulsion to the action of a water-soluble demulsifying agent containing an ammonium salt of an aromatic sulfonic body obtained by condensation of a bicyclic aromatic body and an aliphatic polyhydric alcohol having fewer than twelve carbon atoms.

9. A process for breaking a petroleum emulsion of the water-in-oil type, which consists in subjecting the emulsion to the action of a demulsifying agent containing an aromatic sulfonic body obtained by condensation of a bicyclic aromatic body and an aliphatic polyhydric alcohol having fewer than twelve carbon atoms.

10. A process for breaking a petroleum emulsion of the water-in-oil type, which consists in subjecting the emulsion to the action of a water-soluble demulsifying agent containing an aromatic sulfonic body obtained by condensation of a bicyclic aromatic body and an aliphatic polyhydric alcohol having fewer than twelve carbon atoms.

11. A process for breaking a petroleum emulsion of the water-in-oil type, which consists in subjecting the emulsion to the action of a water-soluble demulsifying agent containing a water-soluble salt of an aromatic sulfonic body obtained by condensation of a bicyclic aromatic body and an aliphatic polyhydric alcohol having fewer than twelve carbon atoms.

12. A process for breaking a petroleum emulsion of the water-in-oil type, which consists in subjecting the emulsion to the action of a water-soluble demulsifying agent containing an ammonium salt of an aromatic sulfonic body obtained by condensation of a bicyclic aromatic body and an aliphatic polyhydric alcohol having fewer than twelve carbon atoms.

13. A process for breaking a petroleum emulsion of the water-in-oil type, which consists in subjecting the emulsion to the action of a demulsifying agent containing an aromatic sulfonic body obtained by condensation of a bicyclic aromatic body and ethylene glycol.

14. A process for breaking a petroleum emulsion of the water-in-oil type, which consists in subjecting the emulsion to the action of a water-soluble demulsifying agent containing an aromatic sulfonic body obtained by condensation of a bicyclic aromatic body and ethylene glycol.

15. A process for breaking a petroleum emulsion of the water-in-oil type, which consists in subjecting the emulsion to the action of a water-soluble demulsifying agent containing a water-soluble salt of an aromatic sulfonic body obtained by condensation of a bicyclic aromatic body and ethylene glycol.

16. A process for breaking a petroleum emulsion of the water-in-oil type, which consists in subjecting the emulsion to the action of a water-soluble demulsifying agent containing an ammonium salt of an aromatic sulfonic body obtained by condensation of a bicyclic aromatic body and ethylene glycol.

17. A process for breaking a petroleum emulsion of the water-in-oil type, which consists in subjecting the emulsion to the action of a demulsifying agent containing an aromatic sulfonic body obtained by condensation of naphthalene and ethylene glycol.

18. A process for breaking a petroleum emulsion of the water-in-oil type, which consists in subjecting the emulsion to the action of a water-soluble demulsifying agent containing an aromatic sulfonic body obtained by condensation of naphthalene and ethylene glycol.

19. A process for breaking a petroleum emulsion of the water-in-oil type, which consists in subjecting the emulsion to the action of a water-soluble demulsifying agent containing a water-soluble salt of an aromatic sulfonic body obtained by condensation of naphthalene and ethylene glycol.

20. A process for breaking a petroleum emulsion of the water-in-oil type, which consists in subjecting the emulsion to the action of a water-soluble demulsifying agent containing an ammonium salt of an aromatic sulfonic body obtained by condensation of naphthalene and ethylene glycol.

MELVIN DE GROOTE.
LOUIS T. MONSON.
ARTHUR F. WIRTEL.